US010264516B2

(12) United States Patent
Van Leeuwen

(10) Patent No.: US 10,264,516 B2
(45) Date of Patent: Apr. 16, 2019

(54) NETWORK DISCOVERY WITH TOUCHLINK OPTION

(71) Applicant: SIGNIFY HOLDING B.V., Eindhoven (NL)

(72) Inventor: Franciscus Wilhelmus Adrianus Alphonsus Van Leeuwen, Eindhoven (NL)

(73) Assignee: SIGNIFY HOLDING B.V., Eindhoven (NL)

(*) Notice: Subject to any disclaimer, the term of this patent is extended or adjusted under 35 U.S.C. 154(b) by 0 days.

(21) Appl. No.: 14/421,847

(22) PCT Filed: Aug. 15, 2013

(86) PCT No.: PCT/IB2013/056663
§ 371 (c)(1),
(2) Date: Feb. 16, 2015

(87) PCT Pub. No.: WO2014/030103
PCT Pub. Date: Feb. 27, 2014

(65) Prior Publication Data
US 2015/0223152 A1 Aug. 6, 2015

Related U.S. Application Data

(60) Provisional application No. 61/691,852, filed on Aug. 22, 2012.

(51) Int. Cl.
*H04W 8/00* (2009.01)
*G08C 17/02* (2006.01)
(Continued)

(52) U.S. Cl.
CPC .......... *H04W 48/16* (2013.01); *G08C 17/02* (2013.01); *H04W 8/005* (2013.01); *H04W 84/18* (2013.01)

(58) Field of Classification Search
CPC ..... H04W 4/008; H04W 8/005; H04W 48/16; H04W 84/18; G08C 17/02
See application file for complete search history.

(56) References Cited

U.S. PATENT DOCUMENTS 8,335,937 B2 * 12/2012 Qi ................. G06F 1/3209
707/622
8,892,722 B1 * 11/2014 Kopikare ............ G06F 15/173
370/329

(Continued)

FOREIGN PATENT DOCUMENTS

CN 101601229 A 12/2009
CN 101998588 A 3/2011

(Continued)

OTHER PUBLICATIONS

Zigbee Alliance: "ZigBee Light Link Standard Version 1.0", Apr. 5, 2012, pp. 1-107, XP002720584, https://www.zigbee.org/Standards/ZigBeeLightLink/download.aspx.

*Primary Examiner* — Andrew Wendell
*Assistant Examiner* — Maryam Soltanzadeh
(74) *Attorney, Agent, or Firm* — Meenakshy Chakravorty

(57) ABSTRACT

Apparatus, method, and computer program product for controlling network discovery of a wireless mesh network, wherein a modified implementation of the network discovery process is suggested. For a touchlink target device, it is sufficient to receive one of all scan request commands that a touchlink initiator node broadcasts for device discovery on a predetermined channel. It is thus enough for the touchlink target device to intermittently switch its receiver to the predetermined channel for a specific duration to receive at least one of those scan command commands.

10 Claims, 6 Drawing Sheets

(51) Int. Cl.
*H04W 48/16* (2009.01)
*H04W 84/18* (2009.01)

(56) References Cited

U.S. PATENT DOCUMENTS

| | | |
|---|---|---|
| 2006/0142034 A1 | 6/2006 | Wentink et al. |
| 2011/0038357 A1* | 2/2011 | Gong .................. H04W 48/16 370/338 |
| 2011/0211219 A1 | 9/2011 | Bradley et al. |
| 2013/0148020 A1* | 6/2013 | Cook ................ H05B 37/0272 348/460 |

FOREIGN PATENT DOCUMENTS

| | | |
|---|---|---|
| JP | 2009545924 A | 12/2009 |
| JP | 2011520359 A | 7/2011 |
| WO | 2006119281 A2 | 11/2006 |
| WO | 2008019138 A2 | 2/2008 |
| WO | 2008019140 A2 | 2/2008 |
| WO | 2011078948 A2 | 6/2011 |
| WO | 2012069956 A1 | 5/2012 |
| WO | 2012080881 A1 | 6/2012 |

* cited by examiner

NETWORK DISCOVERY WITH TOUCHLINK OPTION

CROSS-REFERENCE TO PRIOR APPLICATIONS

This application is the U.S. National Phase application under 35 U.S.C. § 371 of International Application No. PCT/IB2013/056663, filed on Aug. 15, 2013, which claims the benefit of U.S. Provisional Patent Application No. 61/691,852, filed on Aug. 22, 2012. These applications are hereby incorporated by reference herein.

FIELD OF THE INVENTION

The present invention relates to an apparatus, method, and computer program product for performing network discovery of a mesh network such as—but not limited to—a ZigBee Light Link (ZLL) network for intelligent lighting solutions.

BACKGROUND OF THE INVENTION

Mesh networking (topology) is a type of networking where each (network) node must not only capture and disseminate its own data, but also serve as a relay for other nodes, that is, it must collaborate to propagate the data in the network.

FIG. 1 shows an exemplary mesh network architecture with a plurality of nodes 10. A mesh network can be designed using a flooding technique or a routing technique. When using a routing technique, the message propagates along a path, by hopping from node to node until the destination is reached. To ensure all its paths' availability, a routing network must allow for continuous connections and reconfiguration around broken or blocked paths, using self-healing algorithms.

ZigBee is a mesh network that relies heavily on a network device called the coordinator. Such a coordinator is assumed to be always available and therefore always powered. In a lighting system intended for the home in a consumer market, this is a heavy constraint. For this reason, other methods were found to benefit from the ZigBee network functionality (especially routing) without the need of having a coordinator. These other methods and other network operations heavily rely on inter-PAN (Personal Area Network) messages. Inter-PAN messages can be transferred between devices that are on the same channel. A special flag in the message indicates to by-pass the ZigBee Network layer and for this reason, the two communicating devices do not need to be part of the same ZigBee network.

The ZigBee specification ([ZigBee] 053474r19, October 12) describes in section 3.6.1.2 how devices should join a network through a Medium Access Control (MAC) Association. Prior to doing such a MAC Association, devices should perform a network discovery as described in section 3.6.1.3 of the ZigBee specification. Typically, devices that have not yet joined a network search for an "open" network they can join.

FIG. 2 shows a schematic flow diagram of a conventional ZigBee network discovery procedure for obtaining an association in a PAN.

After the procedure for network discovery has started (S), a first channel is determined in step S210 and the scanning system is switched to the determined channel in step S220. Then, in step S230, a single-channel network discovery for an association with a PAN is performed by sending out a beacon request command and waiting some time for a beacon response. In step S240 it is checked whether the current channel is the last channel to be scanned. If not, the procedure branches off to step S250 where the next channel is determined. Then, the procedure continues with step S220 and a new single-channel network discovery is started. If it is determined in step S240 that the current channel was the last channel, the network discovery procedure ends (E). This whole procedure can be executed once, or can be repeated, possibly indefinitely.

The ZLL profile addresses devices and functionality in the over-the-counter, consumer lighting application domain. It is based on ZigBee-Pro and utilizes clusters defined in a ZigBee Cluster Library. The ZLL specification describes an additional way to join a network, called touchlink commissioning. Typically, a user may use a ZLL remote control to "touchlink" a ZLL lighting device or application. This instructs the ZLL device or application to either start a new network or to join an existing network of the ZLL remote control.

Thus, the touchlink commissioning mechanism will give the consumer a simple and intuitive experience when connecting devices together. Touchlinking is a method of finding devices in the neighborhood based on received signal strength. A touchlink action is easy for the user to understand and can replace buttons on a device that would otherwise be required to facilitate commissioning. The touchlink operation is divided into two parts; device discovery and transferring network settings. The result of device discovery is a list of device information which includes network capabilities, device type and whether a device is already participating in a mesh network.

FIG. 3 shows a schematic flow and signalling diagram of a device discovery procedure based on the touchlink initiator procedure according to section 8.4.1.1 of the above ZLL specification.

In the diagram of FIG. 3 the time proceeds from top to bottom, as indicated by the arrows marked with "t". A touchlink target device (TT) stays at a fixed channel, e.g., channel 20 (CH20), and listens to scan request commands (step S310). The touchlink initiator device (TI) first switches to channel 11 (CH11) and broadcast five consecutive inter-PAN scan request command frames (SR), with a duration (aplcScanTimeBaseDuration) of 0.25 s between those broadcasts (in which an inter-PAN scan response command frame from the touchlink target device (TT) could be received), followed by a single broadcast at each of the other ZLL primary channels 15, 20 and 25 (CH15, CH20 and CH25), with a duration (aplcScanTimeBaseDuration) of 0.25 s between those broadcasts. Accordingly, the touchlink target device (TT) will detect or recognize the scan request command which is issued on the same channel 20 (CH20) and will then handle the scan request command in step S320. More specifically, the touchlink target device responds to the scan request command by sending an inter-PAN scan response command, which the touchlink initiator device receives. The touchlink initiator device then has enough information to select the touchlink target device for the next step in the touchlink procedure. The processing in step S320 should be finished before the touchlink initiator switches to the next channel (CH25 in the present example).

A device implemented according to the ZLL specification that is not yet in a ZigBee network would typically search for a network to join (through MAC Association), but at the same time a user may be trying to discover the device by the above touchlink initiator procedure using e.g. a remote control device. Thus, in this case, the device would also act as a ZLL touchlink target device.

However, these network discovery for PAN association and device discovery for touchlinking procedures interfere with each other, causing either or both to fail. Typically, this would cause the touchlink procedure (which is a user-initiated action) to fail, which may cause the user to get frustrated and get a low esteem of the product's quality.

The reason for the interference is that the network discovery procedure for MAC association requires the ZLL device to scan over a set of RF channels, while for being ZLL touchlink target device the ZLL device is normally required to stay at a fixed channel.

FIG. 4 shows this interference based on a schematic signalling diagram of a device discovery procedure by a touchlink initiator device (TI) similar to FIG. 3 and a concurrent network discovery procedure by a device (NDD).

As can be gathered from FIG. 4, the touchlink initiator device (typically a ZLL remote control device) trying to find the touchlink target (typically a ZLL lighting device) cannot find it, as the touchlink target device (which continuously switches through the channels in accordance with the above ZLL specification and broadcasts respective beacon request commands (BR)) is never at the right moment at the channel the touchlink initiator device uses to transmit its scan request commands (SR). The channels can be scanned in any order, but the ZLL Profile specification Version 1.0 ([ZLL]; 11-0037-09, Mar. 26, 2012) states that first a primary channel set (channels 11, 15, 20 and 25) must be scanned, followed by a secondary channel set (channels 12, 13, 14, 16, 17, 18, 19, 21, 22, 23, 24 and 26), as specified in sections 8.5.1 and 8.1.2 of the above ZLL specification.

SUMMARY OF THE INVENTION

An object of the present invention is to provide an improved network discovery scheme for a device which allows concurrent discovery of the same device via a remote control or touchlinking.

This object is achieved by the various claims listed herein.

Accordingly, the proposed network discovery scheme is enhanced by initiating at least one intermittent switch to a listening mode in which a device, which is currently involved in a network discovery process, listens on a predetermined channel for a predetermined duration to allow receipt of a scan request command for device discovery by another device. Thus, the above interference between network discovery for PAN association and device discovery for remote control or touchlinking can be prevented, so that reliability of the remote control or touchlink procedure can be improved when lamps or other devices are actively searching for an open network.

According to a first aspect, the apparatus may be adapted to initiate the sequential search scan over a primary channel set followed by a secondary channel set. Due to the fact that intermittent switching to the listening mode is ensured, the network discovery scan can be enhanced over primary and secondary channels without increasing the risk of interference with a device discovery procedure by another device.

According to a second aspect which may be combined with the above first aspect, the apparatus may be adapted to perform the network discovery for obtaining a MAC association. MAC associations can thus be obtained through network discovery without blocking or interfering device discovery by other devices.

According to a third aspect which can be combined with any one of the first and second aspects, the apparatus may be adapted to repeat the intermittent switch to the listening mode after a third duration selected to be able to receive at least one of a sequence of subsequent scan request commands broadcast by the other device on the predetermined channel. The third duration can be set so that it can be ensured that one of the sequence of scan request commands is received. The third duration may substantially correspond to the sum of the duration of the sequence and the second predetermined duration.

According to a fourth aspect which can be combined with any one of the first to third aspects, the apparatus may be adapted to keep the listening mode while simultaneously performing the search scan. Thereby, overall processing may be streamlined by performing device discovery for touchlinking and network discovery for PAN association in parallel.

According to a fifth aspect which can be combined with any one of the first to fourth aspects, the apparatus may be provided in a wireless device, such as a lighting device of a ZLL system or another ZLL device, which may be a touchlink target device. The remote control may be another wireless device which may act as a touchlink initiator device.

It is noted that the apparatus may be implemented as a discrete hardware circuitry with discrete hardware components, as an integrated chip, as an arrangement of chip modules, or as a signal processing device or chip controlled by a software routine or program stored in a memory, written on a computer readable medium, or downloaded from a network, such as the Internet.

Further advantageous embodiments are defined below.

BRIEF DESCRIPTION OF THE DRAWINGS

The invention will now be described, by way of example, based on embodiments with reference to the accompanying drawings, wherein.

DETAILED DESCRIPTION OF EMBODIMENTS

Various embodiments of the present invention will now be described based on a ZLL system with network discovery for MAC association and touchlink commissioning.

According to the embodiments, a device is allowed to perform a network discovery for a MAC association in a wireless mesh network while at the same time responding to a ZLL touchlink initiator device. In a ZLL touchlink implementation, this would mean that a ZLL device that is searching for an open network can still be touchlinked by using the ZLL remote control functionality (i.e., touchlinking).

This is achieved by using a modified implementation of the device discovery process. This modified implementation is based on assumption that it is sufficient to receive at least one of all scan request commands issued during the device discovery process of the remote device. For a touchlink implementation according to section 8.4.1.2 of the above ZLL specification, it is sufficient to receive one of the eight scan request inter-PAN commands that a touchlink initiator device broadcasts. Because the touchlink initiator device transmits the scan request command on channel 11 five times with 250 ms between them, it is enough for a target device to switch its radio frequency (RF) receiver to channel 11 for a duration of at least 250 ms. Thus, during its network discovery procedure, the device is temporarily switched to a listening mode for listening to potential scan request commands.

Figure 5:
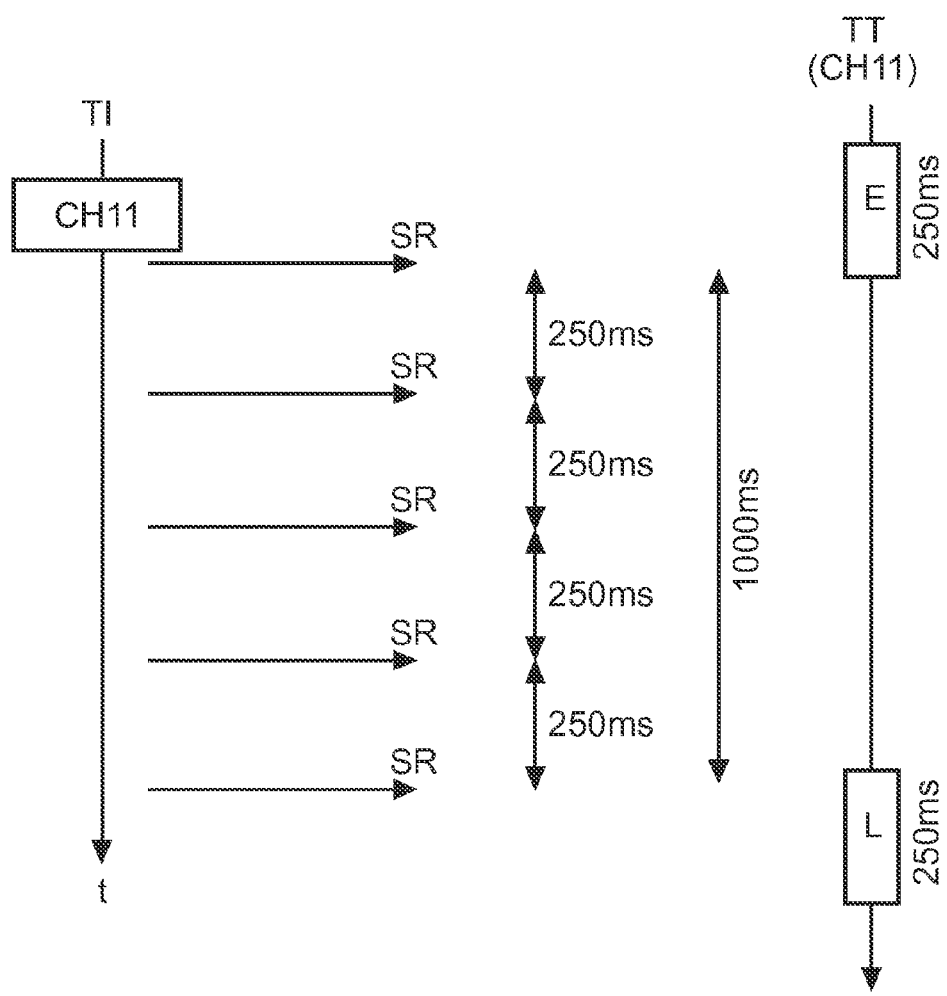
FIG. 5 shows a schematic signalling diagram of a revised network discovery procedure according to a first embodiment.

FIG. 5 shows a schematic flow and signaling diagram of a network discovery procedure according to a first embodiment, where a touchlink initiator device (TI, left portion of FIG. 5) switches to channel 11 (CH11) and then issues or broadcasts five scan request commands (SR) with a time period of 250 ms between each of them. The total duration of the sequence of scan request commands thus amounts to 1000 ms. The touchlink target device (TT, right portion of FIG. 5) may thus start its earliest possible listening mode (E) not more than 250 ms prior to the first scan request command of the touchlink initiator device and start its latest possible listening mode (L) not later than the last scan request command at channel 11 of the touchlink initiator device. The proposed temporary switching may thus be arranged as an intermittent switching repeated every 1250 ms (or faster) to receive at least one of those scan request commands.

Therefore, while the touchlink target device is doing a network discovery according to section 3.6.1.3 of the above ZigBee specification, the touchlink target device switches back to channel 11 often and long enough to ensure that it will receive at least one of those five scan request commands broadcast at channel 11, so that the network discovery for MAC association procedure can be executed while still allowing a touchlink initiator device to discover the touchlink target device.

Figure 6:
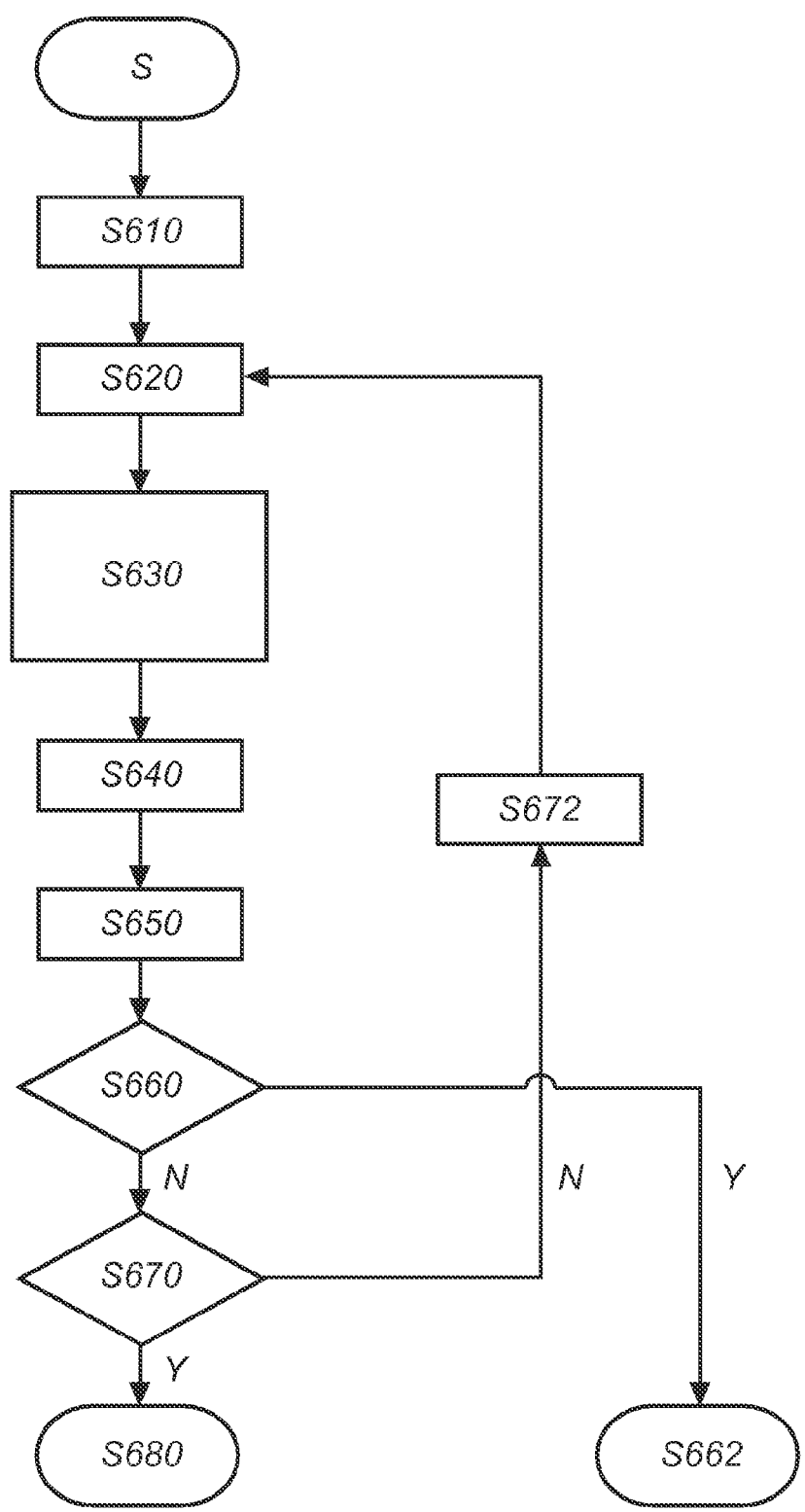
FIG. 6 shows a flow diagram of a revised network discovery procedure according to a second embodiment.

FIG. 6 shows a schematic flow diagram of a more detailed network discovery procedure according to a second embodiment.

After the network discovery for a PAN association has been started (S), a first channel is selected in step S610 and the RF receiver of the concerned network device is switched in step S620 to the selected channel. Then, in step S630, a single-channel network discovery process is performed by sending out a beacon request command and waiting a first predetermined time period for a beacon response. Thereafter, in step S640, the RF receiver is switched to a predetermined fixed channel (e.g. channel 11) to enter into an intermittent listening mode for any scan request command. This mode is kept for a second predetermined time period (e.g. 250 ms) during step S650. Now, it is checked in step S660 whether any scan request command has been received. If so, the procedure branches off to step S662 and the network discovery procedure is aborted to handle the san request command and allow the initiated device discovery procedure. Otherwise, if it is determined that no scan request command has been received, the procedure proceeds to step S670 and it is checked whether the last channel of the network discovery procedure has been scanned. If not, the procedure branches off to step S672 and the next channel is determined. Then, the procedure returns to step S620 and the receiver is switched to the next channel. Otherwise, if it is determined that the last channel has been scanned, the network discovery procedure is completed and the procedure ends.

Figure 1:
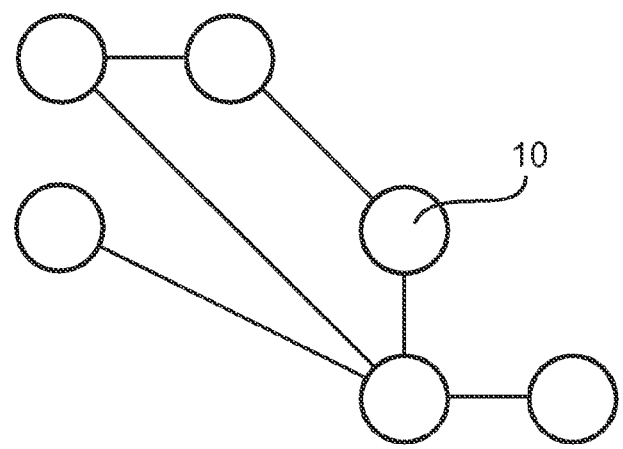
FIG. 1 shows a schematic architecture of a wireless mesh network.
Figure 2:
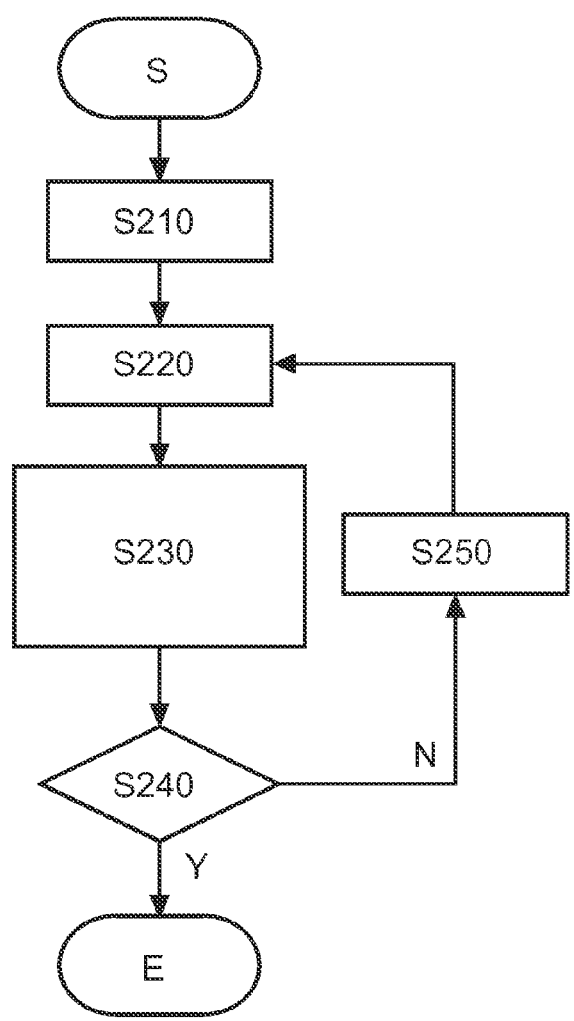
FIG. 2 shows a flow diagram of a conventional ZigBee network discovery procedure.
Figure 3:
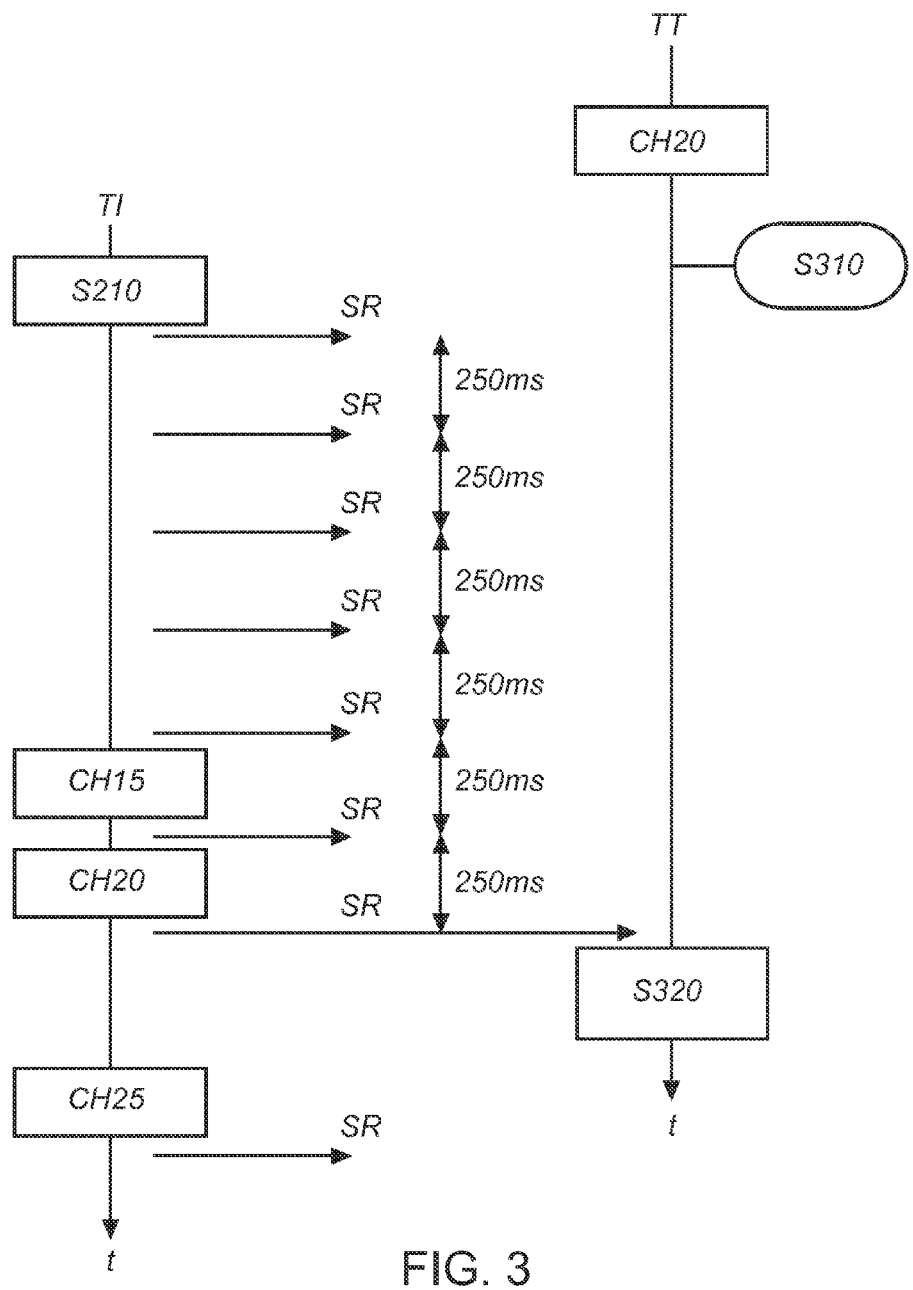
FIG. 3 shows a schematic flow and signalling diagram of a device discovery procedure based on the touchlink initiator procedure.
Figure 4:
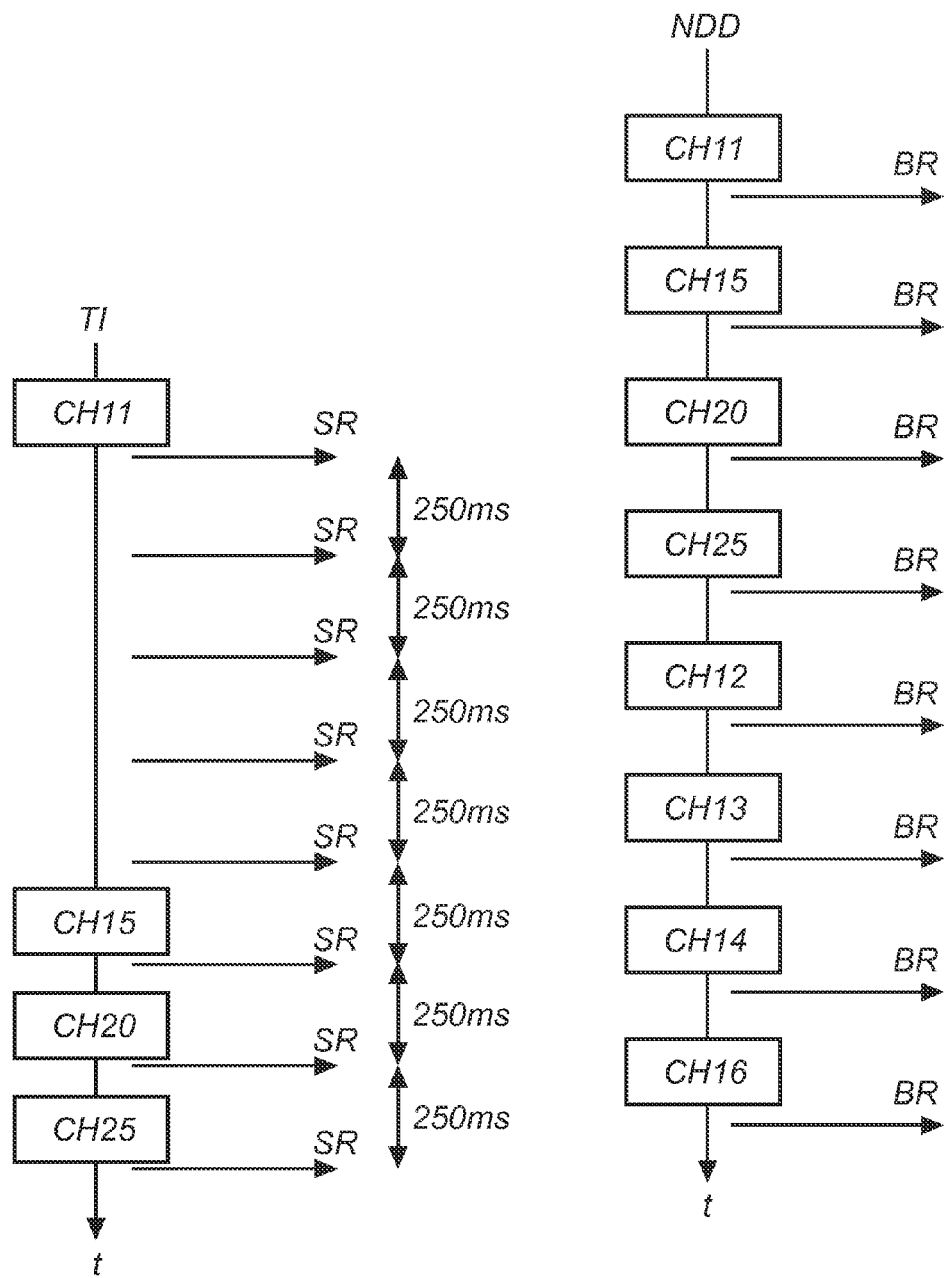
FIG. 4 shows how a network discovery for MAC association interferes with a touchlink procedure.
Figure 7:
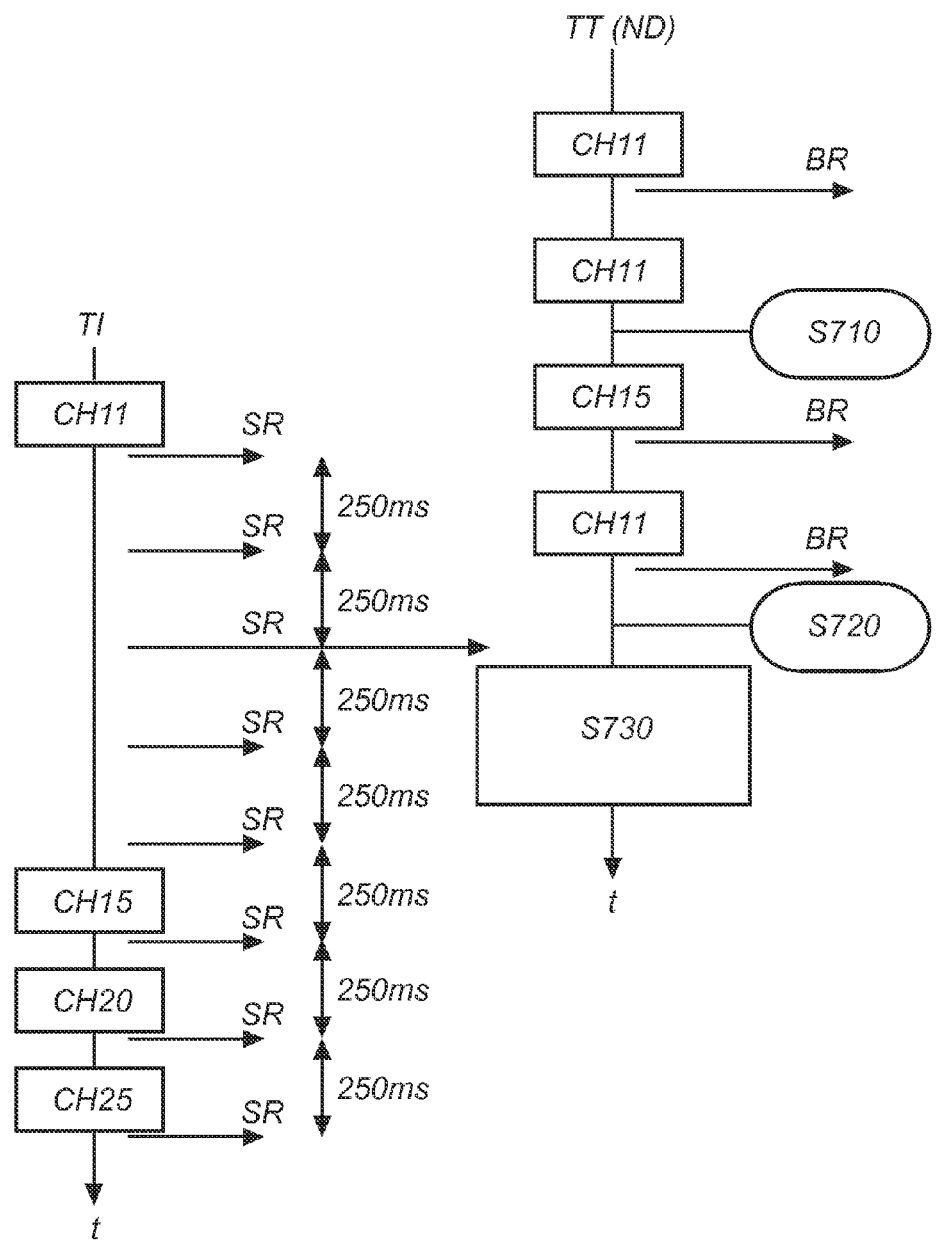
FIG. 7 shows a schematic flow and signalling diagram of the revised network discovery procedure according to the second embodiment.

FIG. 7 shows a signalling and flow diagram similar to FIGS. 3, 4 and 5, based on which the network discovery procedure according to the second embodiment is now described.

The touchlink target device (TT (ND)) on the right portion of FIG. 7, which currently performs network discovery for a MAC association sequentially, switches to channels 11 and 15 in order to broadcast its beacon request commands (BR) and listen for any beacon responses. According to the second embodiment, the touchlink target device intermittently and periodically switches to a listening mode (steps S710 and S720) for listening on channel 11 for any scan request commands which may be broadcast by a touchlink initiator device (TI). It is noted that the first switch to channel 11 of the procedure is actually redundant and could be omitted in this example, as the first channel of the primary channel mask of the network discovery procedure is the same channel 11.

On the left portion of FIG. 7, the timing of the device discovery procedure of the touchlink initiator device is shown, which starts with a switch to channel 11 and the subsequent five scan request commands followed by other channels as shown in FIG. 3. As can be gathered from FIG. 7, the third scan request command is broadcast by the touchlink initiator device during a time period where the touchlink target device is in the listening mode and listens to the same channel 11. Thus, the touchlink target device aborts its network discovery procedure and handles the received scan request command.

It is noted that embodiments can be implemented in different ways to handle this, for example performing network discovery for PAN association at multiple channels before switching back to channel 11. That is, the listening mode is not entered after every broadcast of a beacon request. Switch back to the predetermined listening mode channel (e.g. channel 11) can be repeated after a predetermined duration (e.g. at least every 1250 ms) and the target device can wait for another predetermined duration (e.g. at least 250 ms) so that at least one of the scan request commands is received. Implementations could even choose to exceed these numbers, at the cost of incidental failures. The durations need not be predetermined and may instead have respective random lengths (in a certain range).

Additionally, in the example of FIG. 6, the listening mode is only active during steps S640 and S650. However, in a modification of the second embodiment the listening mode may be active while other steps are being performed, e.g., in S630. Thus, while performing the single-channel network discovery step S630, the listening mode may optionally be active as well. The listening mode may even be always active, so when the search scan takes place, the receiver may switches channel and it may happen that the channel is accidentally at a correct channel to receive a scan request command.

Furthermore, referring to FIG. 7, the scan request command at channel 11 may also be received in the first step while the RF circuit is at channel 11 during network discovery. In another modification of the second embodiment, the first two steps of the touchlink target device may be combined in FIG. 7, so that only a single switch to channel 11 is provided.

The invention can be implemented in any devices that implement the ZLL profile. Typically, these devices have no user controls, such as ZLL lamps or other ZLL devices which actively search for an open network and at the same time allow the user to access the device by a touchlink procedure. Moreover, the above embodiments may be implemented in any mesh network topology which involves network discovery and concurrent device discovery procedures, while the channels and duration may be adapted to the respective system parameters. The procedure of FIG. 6 may be implemented as software routine controlling a processor or any other computer system or computing device provided in or at the target device or node.

In summary, the present invention relates to an apparatus, method, and computer program product for controlling network discovery of a wireless mesh network, wherein a modified implementation of the network discovery process is suggested. For a touchlink target device, it is sufficient to receive one of all scan request commands that a touchlink initiator device broadcasts for device discovery on a predetermined channel. It is thus enough for the touchlink target device to intermittently switch its receiver to the predetermined channel for a specific duration to receive at least one of those scan command commands.

While the invention has been illustrated and described in detail in the drawings and the foregoing description, such illustration and description are to be considered illustrative or exemplary and not restrictive. The invention is not limited to the disclosed embodiments. From reading the present disclosure, other modifications will be apparent to persons skilled in the art. Such modifications may involve other features which are already known in the art and which may be used instead of or in addition to features already described herein.

Variations to the disclosed embodiments can be understood and effected by those skilled in the art, from a study of the drawings, the disclosure and the appended claims. In the claims, the word "comprising" does not exclude other elements or steps, and the indefinite article "a" or "an" does not exclude a plurality of elements or steps. As already mentioned above, the functions of the network discovery procedure, e.g. as described in connection with the above embodiments of FIG. 6, may be implemented as software routines or computer programs which may be stored/distributed on a suitable medium such as an optical storage medium or a solid-state medium supplied together with or as a part of other hardware, but may also be distributed in other forms, such as via the Internet or other wired or wireless telecommunication systems. The mere fact that certain measures are recited in mutually different dependent claims does not indicate that a combination of these measures cannot be used to advantage. Any reference signs in the claims should not be construed as limiting the scope thereof.

The invention claimed is:

1. A wireless touchlink target device for controlling network and device discovery in a ZigBee Light Link network, wherein said wireless touchlink target device is adapted to initiate a network discovery search scan over a plurality of different channels in order to transmit a beacon request command from said device on each of said plurality of different channels and wait for a beacon response during a first duration on each of said plurality of different channels, wherein said wireless touchlink target device is adapted to perform network discovery for obtaining a Medium Access Control association, wherein said wireless touchlink target device is adapted to initiate, during said network discovery search scan, at least one intermittent switch to a device discovery listening mode in which said wireless touchlink target device listens on a predetermined channel for a second duration to allow receipt of a scan request command for device discovery by a touchlink initiator device, and wherein said wireless touchlink target device is configured to allow the one intermittent switch to be in device discovery listening mode while simultaneously performing said network discovery search scan over a single continuous period.

2. The wireless touchlink target device according to claim 1, wherein said wireless device is adapted to initiate said search scan over a primary channel set followed by a secondary channel set.

3. The wireless touchlink target device according to claim 1, wherein said wireless device is adapted to repeat said intermittent switch to said listening mode after a third duration selected to receive at least one of a sequence of subsequent scan request commands broadcast by said other device on said predetermined channel.

4. The wireless touchlink target device according to claim 3, wherein said third duration substantially corresponds to the sum of the duration of said sequence and said second predetermined duration.

5. A wireless mesh network comprising at least one wireless touchlink target device according to claim 1.

6. A method for controlling network and device discovery in a ZigBee Light Link network, said method comprising:
performing a network discovery search scan for obtaining a Medium Access Control association over a plurality of different channels in order to transmit a beacon request command from a wireless touchlink target device on each of said plurality of different channels and wait for a beacon response during a first duration on each of said plurality of different channels; and
initiating at least one intermittent switch to a device discovery listening mode in which said device listens on a predetermined channel for a second duration to allow receipt of a scan request command for device discovery by a touchlink initiator device during said search scan, and wherein said wireless touchlink target device is configured to allow the one intermittent switch to be in device discovery listening mode while simultaneously performing said network discovery search scan over a single continuous period.

7. A non-transitory computer program product comprising code means adapted to produce the steps of method claim 6 when run on a computing device.

8. The method according to claim 6, said method further comprising initiating said search scan over a primary channel set followed by a secondary channel set.

9. The method according to claim 6, said method further comprising repeating said step of initiating the one intermittent switch to said listening mode after a third duration selected to receive at least one of a sequence of subsequent scan request commands broadcast by said other device on said predetermined channel.

10. The method according to claim 9, wherein said third duration substantially corresponds to the sum of the duration of said sequence and said second predetermined duration.

* * * * *